United States Patent
Lai et al.

(10) Patent No.: US 11,308,855 B2
(45) Date of Patent: Apr. 19, 2022

(54) DISPLAY DRIVING METHOD, DISPLAY PANEL AND DISPLAY DEVICE

(71) Applicant: Xiamen Tianma Micro-Electronics Co., Ltd., Xiamen (CN)

(72) Inventors: Meng Lai, Xiamen (CN); Lifeng Lu, Xiamen (CN); Zhilong Zhuang, Xiamen (CN); Jiancai Huang, Xiamen (CN); Yumin Xu, Xiamen (CN)

(73) Assignee: XIAMEN TIANMA MICRO-ELECTRONICS CO., LTD., Xiamen (CN)

(*) Notice: Subject to any disclaimer, the term of this patent is extended or adjusted under 35 U.S.C. 154(b) by 72 days.

(21) Appl. No.: 16/959,154

(22) PCT Filed: Aug. 28, 2019

(86) PCT No.: PCT/CN2019/103071
§ 371 (c)(1),
(2) Date: Jun. 30, 2020

(87) PCT Pub. No.: WO2020/258494
PCT Pub. Date: Dec. 30, 2020

(65) Prior Publication Data
US 2021/0407373 A1    Dec. 30, 2021

(30) Foreign Application Priority Data

Jun. 27, 2019    (CN) .......................... 201910569007.8

(51) Int. Cl.
*G09G 3/20* (2006.01)
*G06F 3/044* (2006.01)
*G06F 3/041* (2006.01)

(52) U.S. Cl.
CPC ......... *G09G 3/2092* (2013.01); *G06F 3/0412* (2013.01); *G06F 3/0416* (2013.01);
(Continued)

(58) Field of Classification Search
CPC ......... G09G 3/2092; G09G 2310/0267; G09G 2310/027; G06F 3/0446; G06F 3/0412; G06F 3/0416
See application file for complete search history.

(56) References Cited

U.S. PATENT DOCUMENTS

| | | | |
|---|---|---|---|
| 2011/0090257 A1* | 4/2011 | Ko | G06F 3/04166 345/660 |
| 2013/0285956 A1* | 10/2013 | Kamii | G06F 3/04886 345/173 |

(Continued)

FOREIGN PATENT DOCUMENTS

| | | |
|---|---|---|
| CN | 101202016 A | 6/2008 |
| CN | 104423823 A | 3/2015 |

(Continued)

*Primary Examiner* — Peter D McLoone
(74) *Attorney, Agent, or Firm* — Kilpatrick Townsend & Stockton, LLP (57) ABSTRACT

Provided are a display driving method, a display panel and a display device. The display driving method includes acquiring a to-be-displayed image; the to-be-displayed image is displayed by display pixels, and a vertical projection of each touch electrode on a plane in which the display pixels are located covers a plurality of display pixels; determining whether an area in which touch electrodes are located is in a display dark area according to the to-be-displayed image; and in response to determining that the area in which the touch electrodes are located is in the display dark area, stopping providing a touch driving signal for at least part of the touch electrodes disposed in the display dark area.

17 Claims, 8 Drawing Sheets

(52) U.S. Cl.
CPC ..... *G06F 3/0446* (2019.05); *G09G 2310/027* (2013.01); *G09G 2310/0267* (2013.01)

(56) References Cited

U.S. PATENT DOCUMENTS

2016/0139702 A1    5/2016  Franklin et al.
2019/0179487 A1*  6/2019  Kong .................... G06F 3/0418

FOREIGN PATENT DOCUMENTS

| CN | 104795042 A | 7/2015 |
|----|-------------|--------|
| CN | 107085481 A | 8/2017 |

* cited by examiner

DISPLAY DRIVING METHOD, DISPLAY PANEL AND DISPLAY DEVICE

CROSS REFERENCE TO RELATED APPLICATIONS

This is a National Stage Application, filed under 35 U.S.C. 371, of International Patent Application No. PCT/CN2019/103071, filed on Aug. 28, 2019, which claims priority to a Chinese patent application No. 201910569007.8 filed at the CNIPA on Jun. 27, 2019 disclosure of which is incorporated herein by reference in its entirety.

FIELD

The present disclosure relates to the field of display technique and, in particular, to a display driving method, a display panel, and a display device.

BACKGROUND

With the development of electronic technologies, a display panel or a display device, as one window for the interactions between users and electronic devices, has attracted much attention. To improve the user experience, a display panel and a display device usually have a touch function, that is, input is performed through a finger or a stylus pen, etc., making the operation more intuitive and simple.

Currently, in the display panel or display device with a touch function, during touch scanning period, touch driving signals are transmitted to multiple touch electrodes, resulting in a large power consumption of the display panel.

SUMMARY

The present disclosure provides a display driving method, a display panel, and a display device to reduce the consumption.

One embodiment of the present disclosure provides a display driving method, the display driving method includes: acquiring a to-be-displayed image, the to-be-displayed image is displayed by display pixels, and a vertical projection of each of the touch electrodes on a plane in which the display pixels are located covers a plurality of display pixels; determining whether an area in which the touch electrode is located is in a display dark area according to the to-be-displayed image; in response to determining that the area in which the touch electrodes are located is in the display dark area, stopping providing a touch driving signal for at least part of the touch electrodes disposed in the display dark area.

One embodiment of the present disclosure provides a display panel. The display panel includes: an image acquisition device, which is configured to acquire a to-be-displayed image, the to-be-displayed image is displayed by display pixels, and a vertical projection of each touch electrode on a plane in which the display pixels are located covers a plurality of display pixels; an image determination device, which is configured to determine whether an area in which the touch electrodes are located is in a display dark area according to the to-be-displayed image; and a signal providing device, which is configured to stop providing the touch driving signal for at least part of the touch electrodes disposed in the display dark area.

One embodiment of the present disclosure further provides a display device including the display panel provided in the other embodiments.

DETAILED DESCRIPTION

Figure 1:
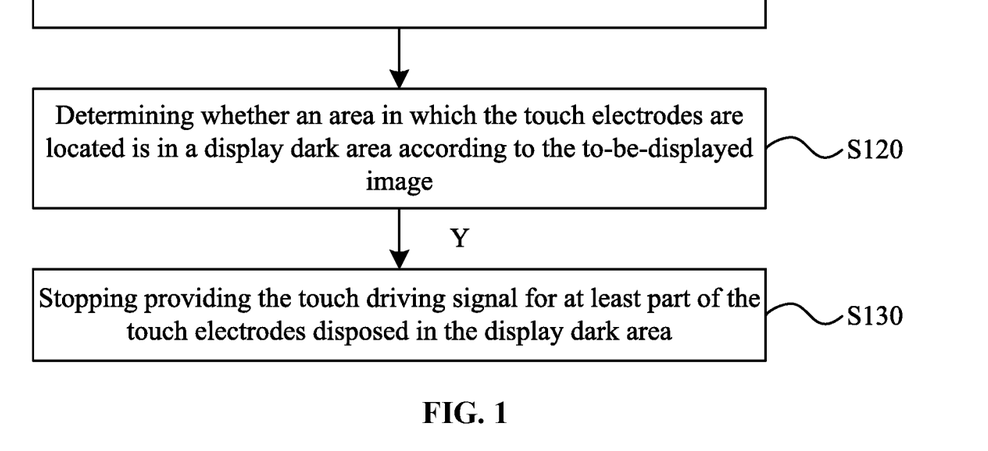
FIG. 1 is a flowchart of a display driving method provided by an embodiment of the present disclosure.

It is to be noted that, for ease of description, only part, not all, of the structures related to the present disclosure are illustrated in the drawings. FIG. 1 is a flowchart of a display driving method provided by an embodiment of the present disclosure. Referring to FIG. 1, the display driving method includes: steps S110 to S130.

In step S110, a to-be-displayed image is acquired.

The to-be-displayed image is displayed by display pixels, and a vertical projection of each of touch electrodes on a plane in which the display pixels are located covers a plurality of display pixels.

Exemplarily, the to-be-displayed image may be a static picture or a frame in a dynamic scene. The display pixels may be the smallest display unit in the display panel or the display device, that is, pixels. In one embodiment, the pixels may be red pixels, green pixels, blue pixels, or another color or type of display pixels.

Exemplarily, the touch electrode may be a built-in electrode structure. A common electrode of the display pixel may be multiplexed as the touch electrode. The common electrode is multiplexed in a spatial-division manner and a time-division manner, that is, a display voltage signal is received during a display period and a touch voltage signal is received during a touch period.

Exemplarily, the touch electrode may be an electrode block in a self-capacitive touch electrode structure, or a touch driving electrode in a mutual-capacity touch electrode structure. The touch driving electrode is configured to receive a touch driving signal provided by an integrated driving circuit. The mutual-capacity touch electrode structure further includes touch sensing electrodes, and the touch sensing electrodes are configured to sense a touch signal.

Figure 2:
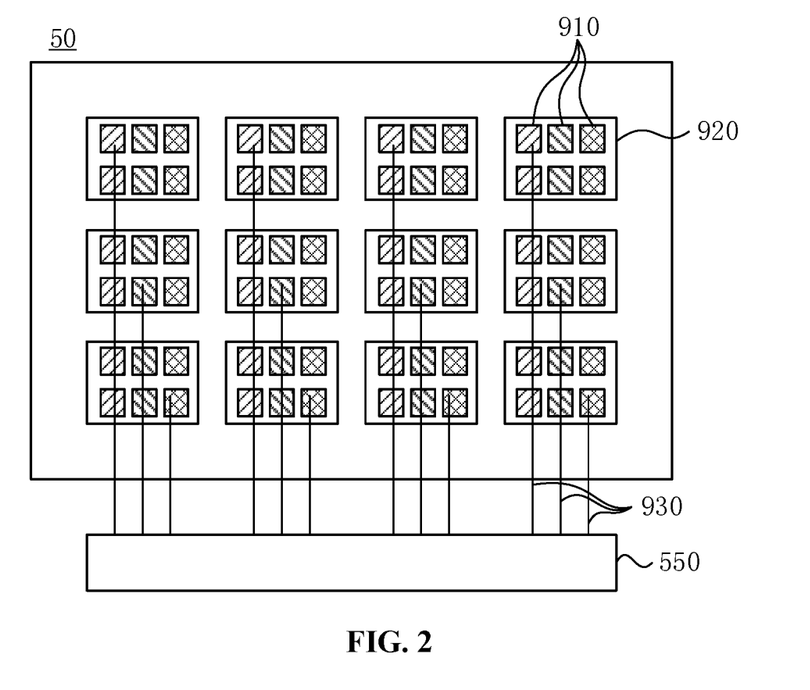
FIG. 2 is a structure diagram of a display panel provided by an embodiment of the present disclosure.

Exemplarily, FIG. 2 is a structural diagram of a display panel provided by an embodiment of the present disclosure. Referring to FIG. 2, the display panel 50 includes multiple display pixels 910 and multiple touch electrodes 920, and each touch electrode 920 may cover the multiple display pixels 910.

Exemplarily, referring to FIG. 2, the display panel 50 may further include an integrated driving circuit 550 which is configured to provide a display-related signal to the multiple display pixels 910 and provide a touch-related signal to the touch electrodes 920, and collect and process a touch-related feedback signal; in this step, the integrated driving circuit 550 may be used for acquiring the to-be-displayed image.

It should be noted that FIG. 2 only exemplarily shows that the number of touch electrodes 920 is 12, and each touch electrode 920 covers 6 display pixels 910, which is not limit to the display driving method and the display panel 50 provided by the embodiment of the present disclosure. In other embodiments, the number of touch electrodes 920 and the number of display pixels 910 covered by the touch electrodes 920 may also be configured according to the display driving method, the display panel, and display and touch requirements.

It should be noted that FIG. 2 only exemplarily shows that each touch electrode 920 totally covers multiple complete display pixels 910, which is not limit to the display driving method and the display panel 50 provided by the embodiment of the present disclosure. In other embodiments, the touch electrode 920 may be configured to not completely cover the complete display pixel 910 but cover a partial area of the display pixel 910, which may be configured actual requirements of the display panel and the display driving method.

In addition, it should be noted that FIG. 2 only exemplarily shows that shapes of the display panel 50, the touch electrodes 920, and the display pixels 910 are square, which is not intended to limit the display panel 50 provided by the embodiment of the present disclosure. In the actual product structure, the shapes of the display panel 50, the touch electrodes 920, and the display pixels 910 may be configured according to display requirements.

In step S120, whether an area in which the touch electrodes are located is in a display dark area is determined according to the to-be-displayed image.

The display dark area is an area having a dark display brightness, which is opposite to a display bright area, that is, an area having a bright display brightness. Usually, a user interface (UI) may be used for guiding a user to interact with a display interface in the display bright area, that is, guiding the user to perform a touch action in the display bright area, but the user is less likely to perform the touch action in the display dark area. Therefore, this step is prepared for subsequent steps to implement stopping providing the touch driving signals for at least part of the touch electrodes in the subsequent step S130, reducing power consumption.

According to some embodiments, "bright brightness" and "dark brightness" are both a relative brightness appeared when the image is bright and dark, and are not limited to an absolute brightness value.

Exemplarily, it may be determined whether the touch electrode is in the display dark area according to a brightness average value, a count statistic value, or a count percentage value of the display pixels in the area in which multiple touch electrodes are located. The specific method steps are described below in detail.

Exemplarily, this step may be performed by the integrated driving circuit 550, or by an additional circuit structure (which is described in detailed in a display panel section), and the method steps are described below in detail.

If it is (Y), that is, the area in which the touch electrodes are located is in the display dark area, the process goes to a step S130.

In step S130, providing the touch driving signal for at least part of the touch electrodes disposed in the display dark area is stopped.

The user is less likely to perform the touch action in the display dark area, in an actual application scenario, the UI may be used for guiding the user to perform the touch action in the display bright area. On this basis, this step may be performed, so that it is not necessary to provide the touch driving signal to each touch electrode, reducing the power consumption while implementing normal interactions between the user with the interface in a touch manner.

It should be noted that this step may include stopping providing the touch driving signal for at least part of the touch electrodes disposed in the display dark area, or stopping providing the touch driving signal for all of the touch electrodes located in the display dark area, which both may reduce the power consumption.

In an embodiment, the step S110 in FIG. 1 may include: acquiring display information of the multiple display pixels, and the display information includes a data voltage, a display gray scale or a display brightness of the display pixels.

The data voltage, the display gray scale and the display brightness may correspondingly represent brightness information of display pixels. The display brightness represents light intensity of the display pixels. The stronger the display pixel light is, the brighter the display brightness is.

The data voltage may be understood as a voltage signal determining the brightness of the display pixels and provided by the integrated driving circuit in the display panel for the plurality of display pixels through the data lines. Exemplarily, the higher the data voltage is, the brighter the display brightness of the display pixels is; or, the higher the data voltage is, the lower the display brightness of the display pixels is, which may be configured according to the type of the display panel.

The display gray scale may reflect different brightness levels. The so-called gray scale is to divide a brightness change between the brightest and the darkest into multiple parts. Exemplarily, taking a 255-level gray scale as an example, 0 represents the darkest, 255 represents the brightest, and between 0 and 255, when the gray scale value is larger, the display brightness is brighter. In other embodiments, other gray scale representation methods may also be used.

In this step, the display information of the display pixel may be one of the data voltage, the display gray scale and the display brightness. The following calculation, comparison and statistics of the display information may be performed based on one of the data voltage, the display gray scale and the display brightness.

It should be noted that this step is prepared for the step S120, and this step may be performed by the integrated driving circuit, or may be performed by an additional circuit structure, to implement the average value calculation or the count statistics of the display information.

In the embodiment of the present disclosure, the S120 may include determining an average value of the display information, or determining based on count statistic information of the display information, and an exemplary description will be given below with reference to FIGS. 3 to 5.

Figure 3:
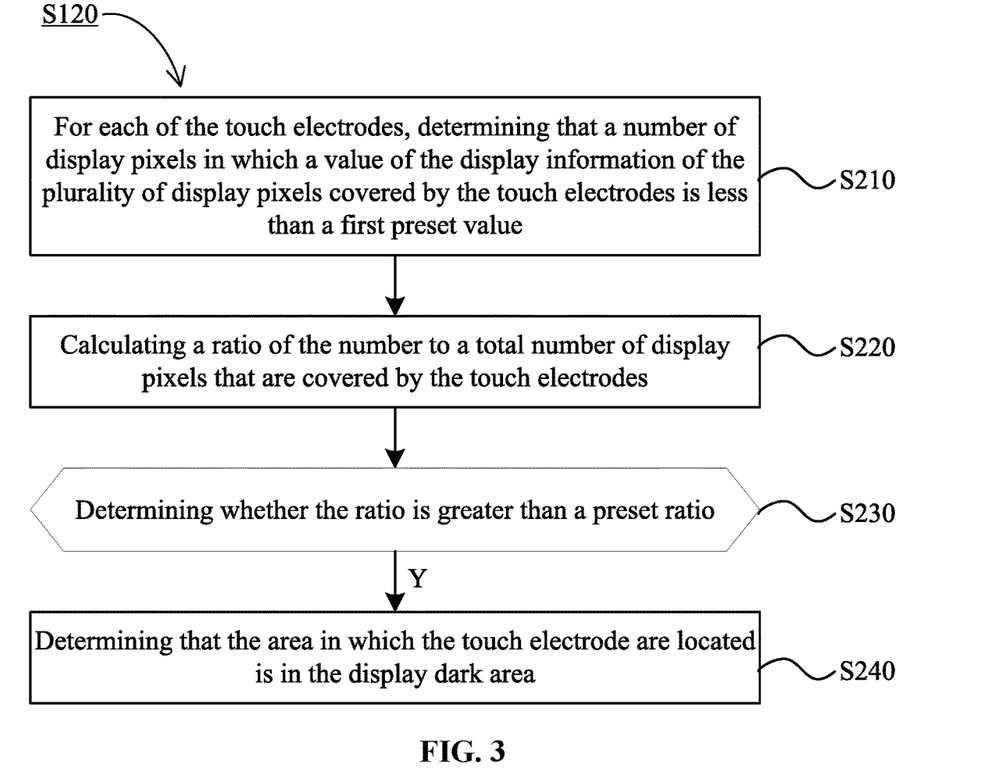
FIG. 3 is a refining flowchart of a step S120 shown in FIG. 1.

In an embodiment, FIG. 3 is a refining flowchart of a step S120 shown in FIG. 1. With reference to FIGS. 1 and 3, the S120 may include steps described below.

In step S210, for each touch electrode, a number of display pixels in which a value of the display information of the multiple display pixels covered by the touch electrodes is less than a first preset value is determined.

When the value of the display information is less than the first preset value, the display brightness of the display pixel is dark. According to the type of the display information, the first preset value may be a first preset voltage value, a first preset gray scale value, or a first preset brightness value. The specific value of the first preset value may be configured according to the actual requirements of the display driving method.

Exemplarily, the number of touch electrodes is 12, and the number of display pixels covered by each touch electrode is 6. For each touch electrode, in the 6 display pixels, the number of display pixels in which a value of the display information is less than the first preset value may be 0, 1, 2, 3, 4, 5 or 6. In other embodiments, other values may be acquired according to the actual structure of the display panel.

This step prepares for calculating a ratio in a subsequent step S220.

In step S220, a ratio of the number to a total number of display pixels covered by the touch electrodes is calculated.

The number determined in the step S210 is divided by the total number of display pixels covered by the corresponding touch electrodes to acquire a ratio of these two numbers, and then according to a magnitude of the ratio, whether the touch electrode is in the display dark area may be determined.

Exemplarily, in step S210, the total number of display pixels is 6, when the number of display pixels in which the value of the display information is less than the first preset value is 3, the ratio is 50%; when the number of display pixels in which the value of the display information is less than the first preset value is 5, the ratio is 5/6; when the number of display pixels in which the value of the display information is less than the first preset value is 6, the ratio is 100%. In other embodiments, other ratios may also be calculated based on the counting results.

In step S230, whether the ratio is greater than a preset ratio is determined.

When the ratio is greater than the preset ratio, it indicates that the number of display pixels in which the value of the display information of the multiple display pixels covered by the touch electrodes is less than the first preset value is larger, that is, the number of display pixels having a darker display brightness is large.

Exemplarily, the preset ratio may be 80%, 85%, 90% or other numbers between 20% and 100% (includes an end point value). The ratio may be configured according to the display driving method or display and touch requirements of the display panel.

Therefore, if it is (Y), that is, the condition is satisfied, the number of display pixels corresponding to the touch electrode with the darker display brightness is large, and it may be determined that the touch electrode is in the display dark area, that is, the process goes to a step S240.

In step S240, it is determined that the area in which the touch electrode are located is in the display dark area.

So far, the touch electrodes in the display dark area are determined.

Figure 4:
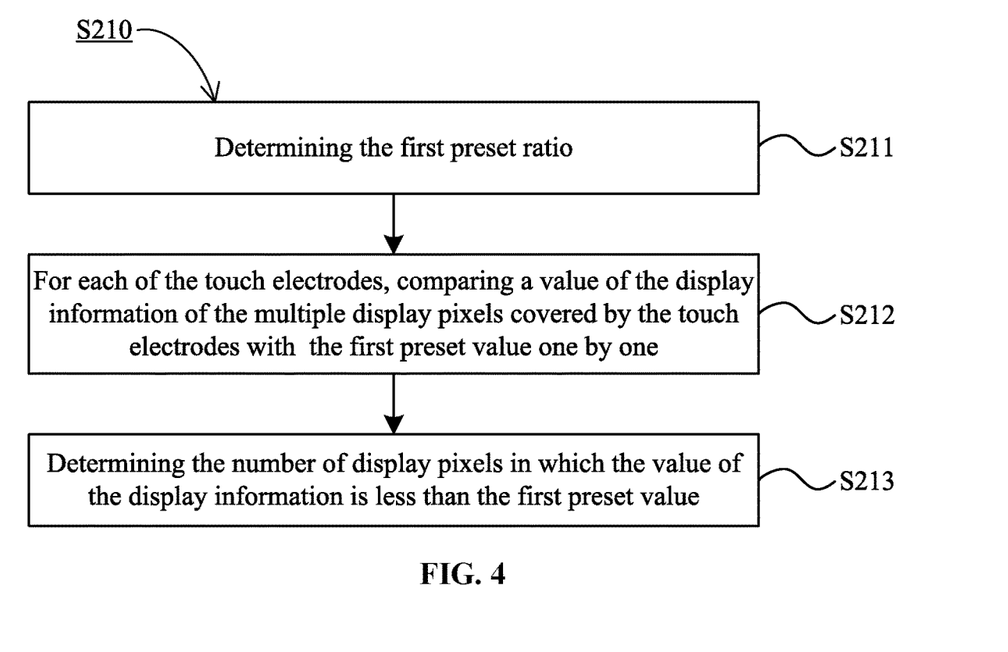
FIG. 4 is a refining flowchart of a step S210 shown in FIG. 3.

In an embodiment, FIG. 4 is a refining flowchart of a step S210 shown in FIG. 3. With reference to FIGS. 3 and 4, the S210 may include steps described below.

In step S211, the first preset ratio is determined.

The first preset value serves as a criterion for determining whether a single display pixel is in a state having a dark display brightness.

Exemplarily, taking the data voltage as an example, the first preset value may be 1.0V, that is, when the value of the voltage signal on the data line is less than 1.0V, the display brightness of the display pixel is dark. It should be noted that for a liquid crystal display panel, 0V is used as a boundary point between a positive voltage and a negative voltage, then a value of the voltage signal in this paragraph less than 1.0V may be understood that an absolute value of the value of the voltage signal is less than 1.0 V, that is, when the voltage signal is 0V, 0.3V, 0.5V, −0.3V or −0.5V or another value whose absolute value is than 1.0V, the display brightness of the display pixel is determined to be dark.

Exemplarily, taking the display gray scale as an example, the first preset value may be 20 gray scales, that is, the gray scale value of the display pixel is less than 20 gray scale values, and it is determined that the display brightness of the display pixel is dark.

In step S212, for each touch electrode, a value of the display information of the multiple display pixels covered by the touch electrode is compared with the magnitude of the first preset value one by one.

Comparing the value of the display information of the multiple display pixels with the magnitude of the first preset value one by one, the display brightness of the multiple display pixels covered by the touch electrode may be determined for preparing the subsequent statistic counting in the step S213.

Exemplarily, when the multiple display pixels covered by the touch electrode are arranged in an array, the display information of the multiple display pixels may be compared with the magnitude of the first preset value row by row, column by column, or according to a set order. In the embodiment of the present disclosure, when the display information of multiple display pixels is compared with the first preset value, the order for comparing multiple display pixels is not limited.

In step S213, the number of display pixels in which the value of the display information is less than the first preset value is determined.

That is, in this step, according to the comparison result of the step S212, the number of display pixels with the darker display brightness in the multiple display pixels covered by the touch electrode may be determined.

In this point, the step S210 ends, it is determined that the number of display pixels in which the value of the display information of multiple display pixels covered by each touch electrode is less than the first preset value is determined to prepare for subsequently calculating the ratio in the step S220.

The method steps described above with reference to FIGS. 3 and 4 exemplarily describe the statistic counting to determine whether the touch electrode is located in the display dark area. The method steps for using the average value to determine are described below with reference to FIG. 5.

Figure 5:
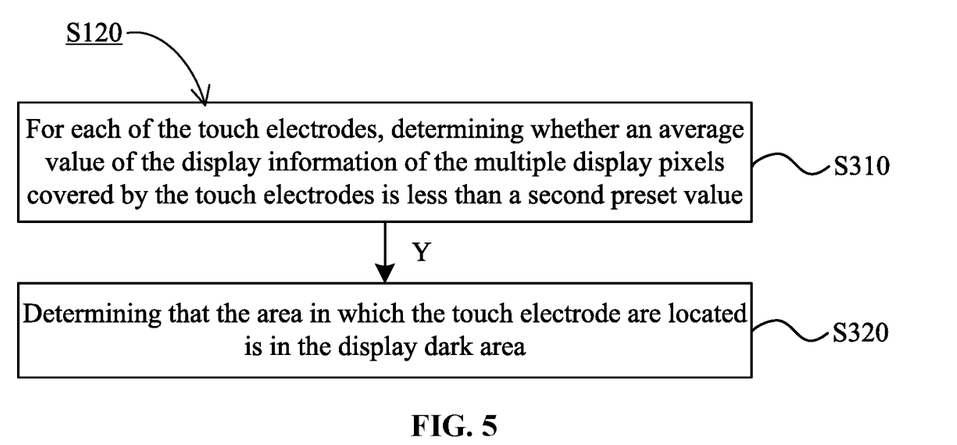
FIG. 5 is another refining flowchart of a step S120 shown in FIG. 1.

In an embodiment, FIG. 5 is another refining flowchart of a step S120 shown in FIG. 1. With reference to FIGS. 1 and 5, the S120 may include steps described below.

In step S310, for each touch electrode, whether an average value of the display information of the multiple display pixels covered by the touch electrodes is less than a second preset value is determined.

The average value of the display information may be an average value of the data voltage, an average value of the display gray scale, or an average value of the display brightness; correspondingly, the second preset value may be a second preset voltage value, a second preset gray scale value or a second preset brightness value, the specific value of the second preset value may be configured according to the actual requirement of the display driving method.

If it is (Y), it is satisfied that the average value of the display information is less than the second preset value, in this case, it may be determined that the touch electrode is in the display dark area, that is, the process goes to a step S320.

In step S320, it is determined that the area in which the touch electrode are located is in the display dark area.

So far, the touch electrodes in the display dark area are determined.

It should be noted that in FIGS. 3 to 5, the first preset value, the preset ratio, and the second preset value can be configured during a product (such as a display panel) formation process, and are fixed values; or, may be defined by the user through the UI in a product usage process, which may be flexibly configured according to the actual application scenario.

The step S120 shown in FIG. 1 is described in detail with reference to FIGS. 3 to 5, and the step S130 in FIG. 1 is described in detail in conjunction with FIGS. 6 and 7.

Figure 6:
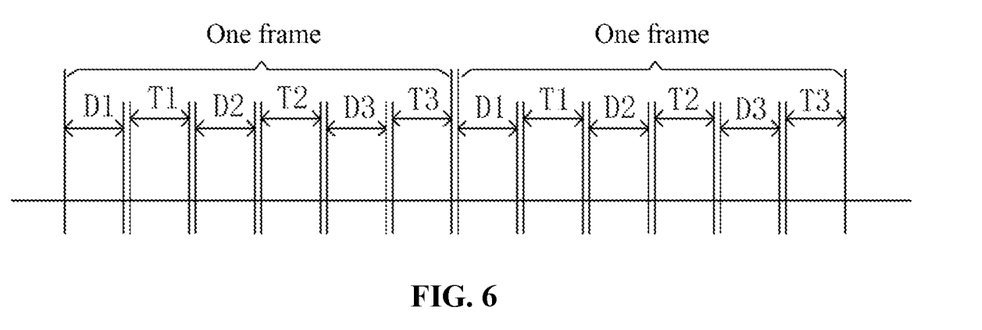
FIG. 6 is a driving timing graph of a display driving method provided by an embodiment of the present disclosure.
Figure 7:
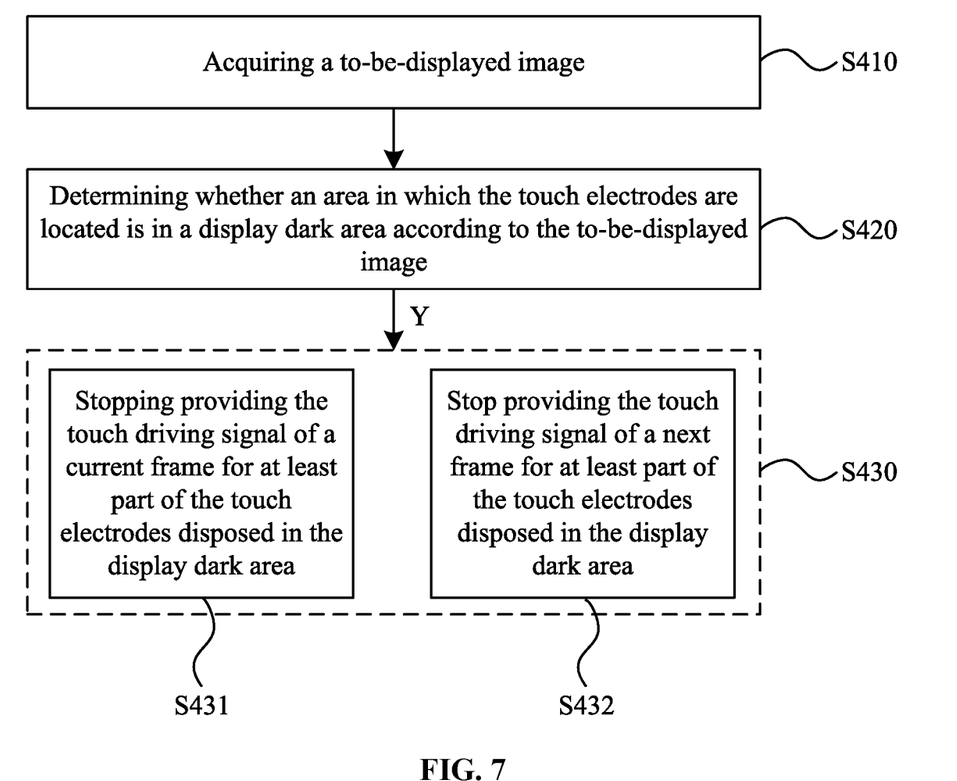
FIG. 7 is a flowchart of another display driving method provided by an embodiment of the present disclosure.

In an embodiment, FIG. 6 is a driving timing graph of a display driving method provided by an embodiment of the present disclosure, and FIG. 7 is a flowchart of another display driving method provided by an embodiment of the present disclosure. Referring to FIGS. 6 and 7, one frame of the to-be-displayed image includes multiple display periods and touch periods which are alternately configured. Exemplarily, FIG. 6 shows a first display period D1, a first touch period T1, a second display period D2, a second touch period T2, a third display period D3, and a third touch period T3 sequentially disposed in one frame. On this basis, the display driving method may include steps described below.

In step S410, the to-be-displayed image is acquired.

In step S420, whether an area in which the touch electrodes are located is in a display dark area is determined according to the to-be-displayed image.

According to whether this step is performed by an integrated driving circuit or by an additional circuit structure, a step S430 performed after the step S420 is configured to be a step S431 or S432.

In step S431, providing the touch driving signal of a current frame for at least part of the touch electrodes disposed in the display dark area is stopped.

When the step S420 is performed by the integrated driving circuit, the integrated driving circuit may determine whether the current frame has the touch electrode located in the display dark area according to the acquired display information of the to-be-displayed image of the current frame, and the step S431 is performed to control the touch driving signal of the current frame.

In step S432, providing the touch driving signal of a next frame for at least part of the touch electrodes disposed in the display dark area is stopped.

When the step S420 is performed by the additional circuit structure, when the circuit structure performs an image display on the display panel, it may determine whether the current frame has the touch electrode located in the display dark area according to the acquired to-be-displayed image or information of the displayed image of the current frame, and control the touch driving signal of the next frame according to the display information of the current frame, i.e., performing the step S432.

The display driving method provided in the embodiment of the present disclosure is configured to determine the to-be-displayed image in the area in which the touch electrodes are located before providing the touch driving signal to the touch electrode; when the area in which the touch electrodes are located is in the display dark area, providing the touch signal for at least part of the touch electrodes in the display dark area is stopped. Therefore, when there are touch electrodes in the display dark area, it is not necessary to provide the touch driving signal for all touch electrodes, but it only needs to ensure to provide the touch driving signals for the touch electrodes not in the display dark area, to ensure that touch interface interaction is implemented. Therefore, according to a to-be-displayed state of the to-be-displayed image, outputting of at least part of touch driving signals may be turned off, which is beneficial to reduce the power consumption.

An embodiment of the present disclosure further provides a display panel, which can be used for performing the display driving method provided in the above embodiments, or it may be understood that the display panel may be controlled by the display driving method provided in the above embodiment to display a picture to be displayed and provide the touch driving signal to achieve a display function and a touch function. Therefore, the display panel also has the beneficial effects of the display driving method according to the above-mentioned embodiments, and the same content is not repeated hereinafter and may be understood by referring to the above description.

Figure 8:
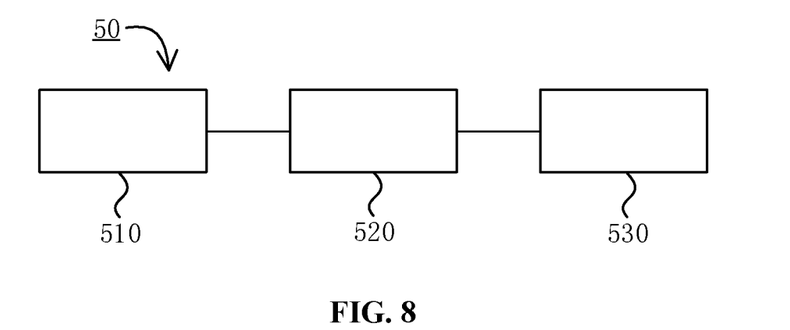
FIG. 8 is a structure diagram of another display panel provided by an embodiment of the present disclosure.

Exemplarily, FIG. 8 is a structural diagram of another display panel provided by an embodiment of the present disclosure. Referring to FIG. 8, the display panel 50 includes: an image acquisition device 510, which is configured to acquire a to-be-displayed image; the to-be-displayed image is displayed by display pixels, and a vertical projection of each touch electrode on a plane in which the display pixels are located covers a plurality of display pixels; an image determination device 520, which is configured to determine whether an area in which the touch electrode is located is in a display dark area according to the to-be-displayed image; and a signal providing device 530, which is configured to stop providing the touch driving signal for at least part of the touch electrodes disposed in the display dark area.

In this way, when the image determination device 520 determines that there are touch electrodes in the display dark area according to the to-be-displayed image acquired by the image acquisition device 510, the signal providing device 530 may stop providing the touch driving signal for at least part of the touch electrodes disposed in the display dark area. Therefore, it may not provide the touch driving signal to all touch electrodes, which may reduce the power consumption.

Figure 9:
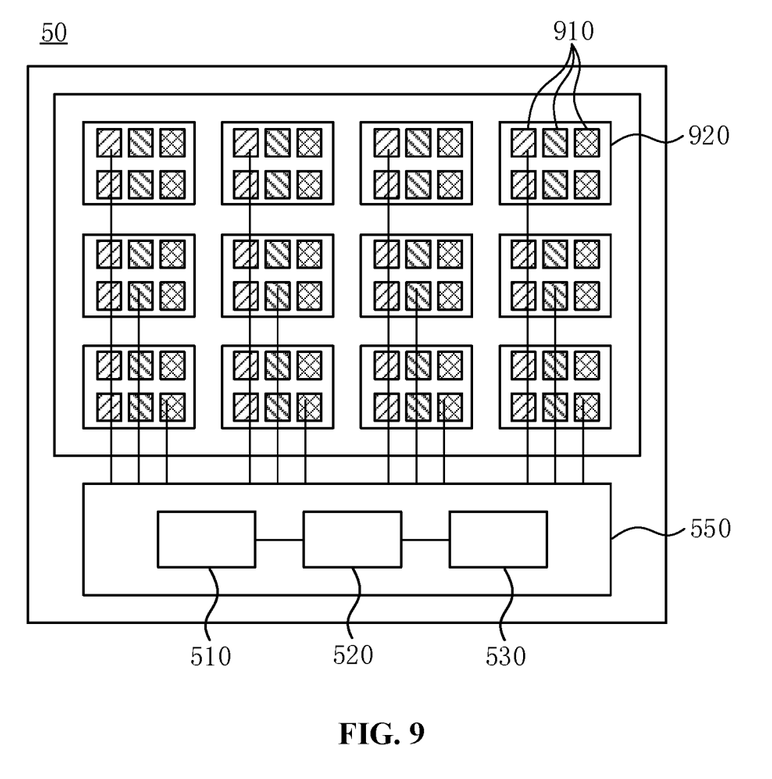
FIG. 9 is a structure diagram of another display panel provided by an embodiment of the present disclosure.

In an embodiment, FIG. 9 is a structure diagram of another display panel provided by an embodiment of the present disclosure. Referring to FIG. 9, the display panel 50 further includes an integrated driving circuit 550; the image acquisition device 510, the image determination device 520, and the signal providing device 530 are integrated into the integrated driving circuit 550.

Circuit elements or algorithms which are implemented the above functions may be configured in the image acquisition device 510, i.e., implementing the functions of the image acquisition device 510, the image determination device 520, and the signal providing device 530, so that the product structure and the control method are simple.

Exemplarily, taking the algorithms integrated in the image acquisition device 510 as an example, a preset gray scale value may be configured, by comparing a display gray scale of the display pixels covered by the touch electrodes with a preset gray scale value, and calculating a ratio of the number of the display pixels in which the display gray scale is less than the preset gray scale value to a total number of the display pixels covered by the touch electrodes, and comparing the calculated ratio with a preset ratio, whether the touch electrode is in the display dark area is determined.

Exemplarily, the preset gray scale value may be 20 gray scales, and the case where the area in which the touch electrodes are located is in the display dark area may include that:

1) all display pixels 910 output a dark state (a black screen), that is, all output 0 gray scale;

2) all display pixels 910 output a low gray scale, that is, the display gray scale ranges from 0 to 20;

3) more than 80% of the display pixels 910 output the low gray scale, that is, the display gray scale of more than 80% of the display pixels 910 ranges from 0 to 20.

Since the integrated driving circuit 550 may know the display state of all display pixels 910 by acquiring the display information of the to-be-displayed image, the above multiple situations may be determined by algorithms built in the integrated driving circuit 550, that is, whether the area in which the touch electrodes 920 are located is in the display dark area is determined by the algorithms built in the integrated driving circuit 550, determining whether the touch driving signal of the current frame or the next frame is stopped.

In other embodiments, the preset gray scale value may also be configured according to the actual demands of the display panel 50.

Figure 10:
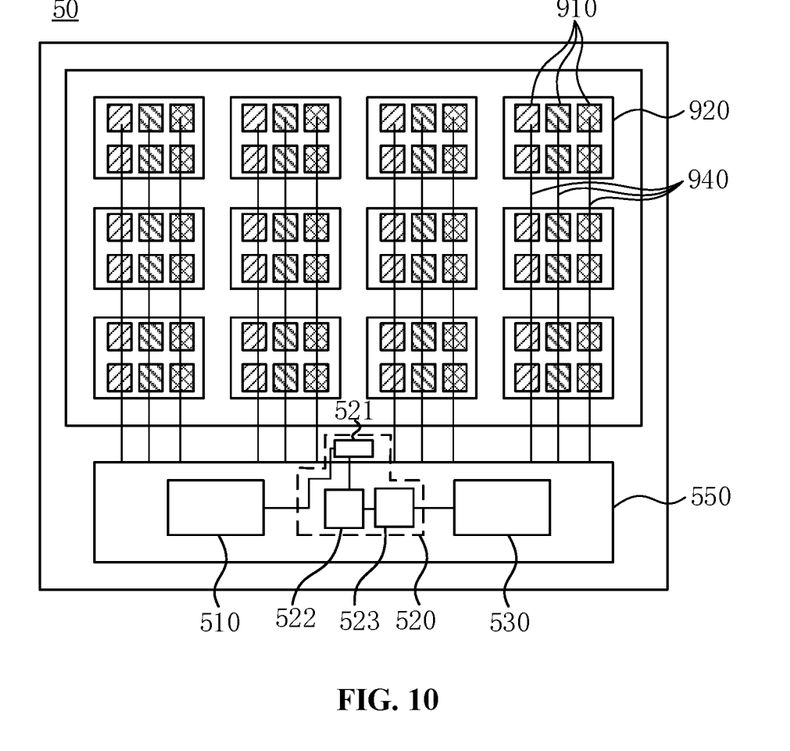
FIG. 10 is a structure diagram of another display panel provided by an embodiment of the present disclosure.

In an embodiment, FIG. 10 is a structure diagram of another display panel provided by an embodiment of the present disclosure. Referring to FIG. 10, the image determination device 520 includes a number determination sub-device 521, a ratio calculation sub-device 522, and a status determination sub-device 523. The number determination sub-device 521 is configured to for each touch electrode, determine a number of display pixels in which a value of the display information of the plurality of display pixels covered by the touch electrodes is less than a first preset value; the ratio calculation sub-device 522 is configured to calculate a ratio of the number to a total number of display pixels covered by the touch electrodes; the status determination sub-device 523 is configured to determine that the area in which the touch electrodes are located is in the display dark area in response to determining that a ratio is greater than a preset ratio; the display panel 50 also includes an integrated driving circuit; the image acquisition device 510, the ratio calculation sub-device 522, the status determination sub-device 523 and the signal providing device 530 are integrated into the integrated driving circuit 550.

Circuit elements or algorithm programs which are implementing the above functions may be configured in the integrated driving circuit 550, i.e., implementing functions of the image acquisition device 510, the ratio calculation sub-device 522, the status determination sub-device 523 and the signal providing device 530, so that the product structure and the control method are simple.

It should be noted that FIGS. 8 to 10 only exemplarily show that the display panel 50 includes multiple function devices, and the multiple function devices are only divided according to functionality. In the actual product structure, multiple devices may be integrated with each other.

Figure 11:
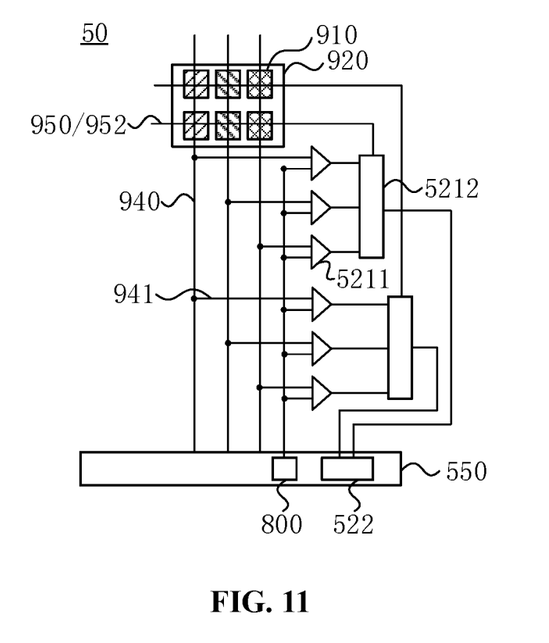
FIG. 11 is a structure diagram of another display panel provided by an embodiment of the present disclosure.

In an embodiment, FIG. 11 is a structure diagram of another display panel provided by an embodiment of the present disclosure, and exemplarily shows a partial circuit structure of the number determination sub-device 521 in FIG. 10. Referring to FIGS. 10 and 11, the number determination sub-device 521 includes a comparator 5211 and a counter 5212, the display panel 50 further includes multiple data lines 940, multiple scan lines 950, and display pixels 910 arranged in an array. The pixel areas are formed by the intersections of the data lines 940 and the scanning lines 950 (exemplarily, the pixel areas uses intersections of the data lines 940 and the scanning lines 950 as a reference), and each pixel area is provided with one display pixel 910, a control terminal of the display pixel 910 is electrically connected to the scanning line 950, and a data terminal of the display pixel 910 is electrically connected to the data line 940; the data line 940 is electrically connected to a data input terminal of the comparator 5211, a reference input terminal of the comparator 5211 is electrically connected to one reference signal terminal 800, and an output terminal of the comparator 5211 is electrically connected to an input terminal of the counter 5212, and an output terminal of the counter 5212 is electrically connected to a ratio calculation sub-device 522.

The data lines 940 are configured to provide a data voltage signal to the display pixels according to the display information. For one display pixel 910, the comparator 5211 may be used for comparing the data voltage signal with a reference signal provided by a reference signal terminal 800, and output the comparison result to the counter 5212.

Exemplarily, the reference signal is a reference voltage signal, and the reference voltage signal is a voltage standard for determining the display dark area. Comparing the data voltage signal with the reference voltage signal, if the data voltage signal is higher than or equal to the reference voltage signal, the comparator 5211 outputs "1" to the counter 5212, indicating that the display brightness of the display pixel 910 is relatively bright, that is, in a display bright state, or an active state; if the data voltage signal is lower than the reference voltage signal, the comparator 5211 outputs "0" to the counter 5212, indicating that the display brightness of the display pixel 910 is relatively dark, that is, in the display dark state, or an inactive state. The counter 5212 is turned on through the counter control signal line 952, and the number of "0" and/or "1" input by the comparator 5211 is counted by the counter 5212. It may be known that the number of display pixels 910 with a darker display brightness in the display pixels 910 covered by the touch electrode 920, the number is transmitted to the ratio calculation sub-device 522, the ratio calculation sub-device 522 calculates a ratio of the number to the total number of display pixels 910 covered by the touch electrode 920, and then compares a relative magnitude of the ratio with a relative magnitude of a preset ratio by the status determination sub-device 523, and when the ratio is greater than the preset ratio, that is, the number of display pixels 910 with the darker display brightness is large, the touch electrode 920 is determined to be in the display dark area.

Exemplarily, the reference signal terminal 800 may also be integrated into the integrated driving circuit 550.

Exemplarily, the reference signal provided by the reference signal terminal 800 may be 0.3V, and determining one touch electrode to be in the display dark area may include: the display brightness of all display pixels 910 covered by the touch electrode 920 is relatively dark, the data voltages of all display pixels 910 range from 0 to 0.3V.

Exemplarily, the reference signal provided by the reference signal terminal 800 may be 1.0V, and determining one touch electrode to be in the display dark area may include: the display brightness of all display pixels 910 covered by the touch electrode 920 is in a low gray scale range the data voltages of all display pixels 910 range from 0 to 1.0V. In one embodiment, the number of display pixels greater than the preset ratio is in the low gray scale range. In one embodiment, in all display pixels 910 covered by the touch electrode 920, more than 80% of the display pixels 910 whose data voltages range from 0 to 0.3V.

Exemplarily, the integrated driving circuit 550 integrates other function devices in addition to the comparator 5211 and the counter 5212. Multiple function devices in the integrated driving circuit 550 cooperate to determine whether the touch electrode 920 is in the display dark area according to the input result of the counter 5212. If the touch electrode 920 is in the display dark area, the touch driving signal of a next frame may be turned-off to reduce the power consumption.

Exemplarily, when the display panel 50 is applied to the in-vehicle display field, a gray scale of a UI may be used for guiding the user to reduce a touching probability of the display dark area from senses, to close the touch driving signal of the touch electrode 920 not applied in the current frame or the next frame to save the power consumption.

In an embodiment, referring to FIG. 11, a structure in which the comparator 5211 and the counter 5212 are not multiplexed is shown. For multiple display pixels 910 covered by the same touch electrode 920, multiple comparators 5211 and at least one counter 5212 are disposed; each comparator 5211 includes one data input terminal, one reference input terminal and one output terminal; the counter 5212 includes multiple input ends, one control terminal and one output terminal; the multiple display pixels 910 are configured in one-to-one correspondence with the multiple comparators 5211; where one of the data lines 940 corresponding to each display pixel 910 is electrically connected to the data input terminal of a respective one of the comparators 5211 through one auxiliary connection line 941, and reference input terminals of the multiple comparators 5211 are electrically connected to a same reference signal terminal 800; the output terminal of the comparator 5211 to which the display pixels 910 in a same row are electrically connected is electrically connected to the input end of a same counter 5212, a control terminal of the counter 5212 is electrically connected to a counter control signal line 952; and the counter control signal line 952 is configured to provide a control signal to the counter 5212.

The counter 5212 is turned on by a control signal of the counter control signal line 952, and "0" or "1" states of the display pixels 910 in a row corresponding to the counter 5212 may be recorded and counted. One touch electrode 920 covers how many rows (such as two rows in FIG. 11) of display pixels 910, correspondingly, how many counters 5212 (such as two in FIG. 11) are configured. The ratio calculation sub-device 522 in the integrated driving circuit 550 receives a recording result of the counters 5212 (such as two rows in FIG. 11) corresponding to the same touch electrode 920 and calculates the ratio according to the statistic number. Other function devices in a post-integrated driving circuit 550 may determine whether the touch electrode 920 is in the display dark area; if it is, the touch driving signal of the next frame may be turned off to reduce the power consumption.

Figure 12:
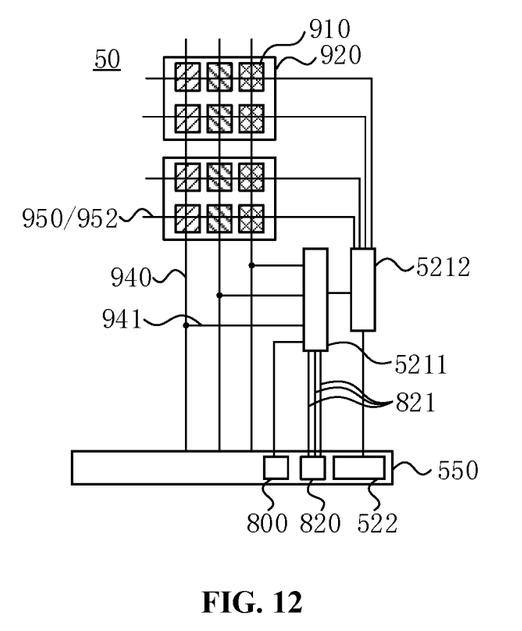
FIG. 12 is a structure diagram of another display panel provided by an embodiment of the present disclosure.

In an embodiment, FIG. 12 is a structure diagram of another display panel provided by an embodiment of the present disclosure, and shows a structure in which a comparator and a counter are multiplexed. Referring to FIG. 12, touch electrodes 920 are arranged in an array, and each touch electrode 920 covers display pixels 910 of M (such as M=2) rows and N (such as N=3) columns; both M and N are greater positive integers greater than 0 and a comparator 5211 and a counter 5212 are configured corresponding to A (such as A=2) touch electrodes 920 in a same column; each comparator 5211 includes N data input terminals, one reference input terminals, N control terminals, and one output terminal, the counter 5212 includes one input end, one output terminal and M*A control terminals; A is a positive integer greater than 0; where each data line 940 is electrically connected to one data input terminals of the comparator 5211 through one auxiliary connection line 941, the reference input terminals of the comparator 5211 is electrically connected to one reference signal terminal 800, and the output terminal of the comparator 5211 is electrically connected to the input terminal of the counter 5212; the N control terminals of the comparator 5211 are electrically connected to a respective one of N comparator control signal lines 821, and M*A control terminals of the counter 5212 are electrically connected to a respective one of M*A counter control signal lines 952; the comparator control signal lines 821 are configured to provide a control signal to the comparator 5211, and the counter control signal lines 952 are configured to provide the control signal to the counter 5212.

A column of touch electrodes 920 may be multiplexed with a counter 5212, and each row of the counter control signal lines 952 may be used for determination. In one embodiment, according to an orientation in FIG. 12, from right top to down, when a first counter control signal line 952 provides a logic high-level signal, the counter 5212 is turned on to record "0" or "1" data corresponding to the display pixels 910 in a first row; when the first counter control signal line 952 provides a logic low-level signal, the counter 5212 determines that counting of this row ends. When a second counter control signal line 952 provides a logic high-level signal, the counter 5212 is turned on to record "0" or "1" data corresponding to the display pixels 910 in a second row; when the second counter control signal line 952 provides a logic low-level signal, the counter 5212 determines that counting of this row ends. In this way, the state of the multiple display pixels 910 covered by the touch electrode 920 is recorded. Such multiplexing method may reduce the number of counters 5212.

Similarly, the comparator 5211 may also be multiplexed to reduce its number. Exemplarily, the comparator 5211 is turned on by using the comparator control signal line 821, and signals of multiple columns of display pixels 910 may be determined separately, such method may reduce the number of comparators 5211.

Combining a working process of the comparator 5211 and the counter 5212, an overall comparison statistic process that may be obtained is: for each row of display pixels 910, when the counter control signal line 952 is a logic high-level signal, the counter 5212 is enabled, and the comparator control signal line 821 is a logic high-level signal, the comparator 5211 is enabled. In this case, a data voltage of display pixels 910 in a first row and a first column covered by the touch electrode 920 is compared with a reference signal voltage, and the comparator 5211 outputs "1" or "0" to the counter 5212 for recording. This comparator control signal line 821 provides a logic low-level signal, and the comparator 5211 is reset; a next comparator control signal line 821 provides a logic high-level signal, and a data voltage of display pixels 910 in the first row and a second column with the reference signal voltage, the comparator 5211 outputs "1" or "0" to the counter 5212 for recording . . . , in this way, when the counting of this row ends, the counter control signal line 952 provides a logic low-level signal and the counter is reset, and a next row is moved to. The counter 5212 records and accumulates the output result of the comparator 5211.

By multiplexing the counter 5212 and the comparator 5211, the number of required counters 5212 and comparators 5211 may be reduced, which may save the space.

Figure 13:
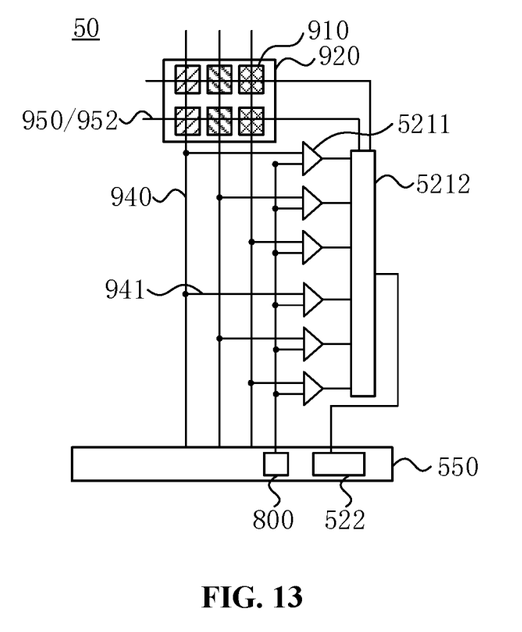
FIG. 13 is a structure diagram of another display panel provided by an embodiment of the present disclosure.

In an embodiment, FIG. 13 is a structure diagram of another display panel provided by an embodiment of the present disclosure, and only shows a structure in which a counter 5212 is multiplexed. Referring to FIG. 13, for the multiple display pixels 910 covered by a same touch electrode 920, multiple comparators 5211 and at least one counter 5212 are configured; each of the multiple comparators includes one data input terminal, one reference input terminal and one output terminal; the counter 5212 includes multiple input terminals, multiple control terminals and one output terminal. The multiple display pixels 910 are configured in one-to-one correspondence with the multiple comparators 5211; the multiple comparators 5211 correspond to the multiple input terminals of the counter 5212, and each row of the display pixels 910 correspond to the control terminal of the counter 5212. Where the data line 940 corresponding to each display pixel 910 is electrically connected to the data input terminal of a respective one of the comparators 5211 through one auxiliary connection line 941, and reference input terminals of the multiple comparators 5211 are electrically connected to a same reference signal terminal 800; the output terminals of the multiple comparators 5211 are electrically connected to the multiple input terminals of the counter 5212, each of the multiple control terminals of the counter 5212 one-to-one correspond and is electrically connected to a respective one of the multiple counter control signal lines 952, and the counter control signal lines 952 are configured to provide a control signal to the counter 5212.

When the counter control signal line 952 provides a logic high-level signal, the counter 5212 operates and records a data state of the corresponding multiple comparators 5211 respectively.

In this way, the number of counters 5212 may be reduced at the same time of ensuring a lower wiring difficulty.

It should be noted that proceeding contents illustrate the working process of the comparator 5211 and counter 5212 by taking an example in which the counter 5212 operates only when the counter control signal line 952 provides the logic high-level signal and the comparator 5211 operates when the comparator control signal line 821 provides the logic high-level signal. In other embodiments, the comparator 5211 and the counter 5212 may both configured to operate under the logic low-level signal; or operating level signals of the comparator 5211 and the counter 5212 are different.

Secondly, it should be noted that in other embodiments, only the comparator 5211 may be configured to be multiplexed, or the statistic counting of the comparator 5211 and the counter 5212 for the display information of the display pixels 910 in a partial area may be multiplexed.

In one embodiment, referring to any one of FIGS. 11 to 13, at least one scanning line 950 is multiplexed as the counter control signal line 952.

In this way, there is no need to add an additional counter control signal line 952, which is helpful to ensure a small number of wirings; at the same time, a timing sequence of the scanning line 950 may be used as a timing sequence of the counter control signal line 952 without additional timing sequence control, which is beneficial to reduce the circuit design difficulty and the timing sequence control difficulty.

In an embodiment, the comparator 5211 and the counter 5212 are disposed in a flexible circuit board, a driving integrated circuit or a peripheral circuit area of the display panel 50.

In this way, configuration flexibility of the comparator 5211 and the counter 5212 may be improved.

Exemplarily, a shift register circuit may also be provided in the peripheral circuit area.

It should be noted that the display panel 50 may also include other circuit or optical structures which is not described in the embodiments of the present disclosure.

On the basis of the above-mentioned embodiments, embodiments of the present disclosure further provide a display device. The display device includes any one of the display panels provided in the above-mentioned embodiments. Therefore, the display device also has beneficial effects of the display panel provided in the above-mentioned embodiments; similarities may be understood with reference to the above description and will not be described hereinafter.

Figure 14:
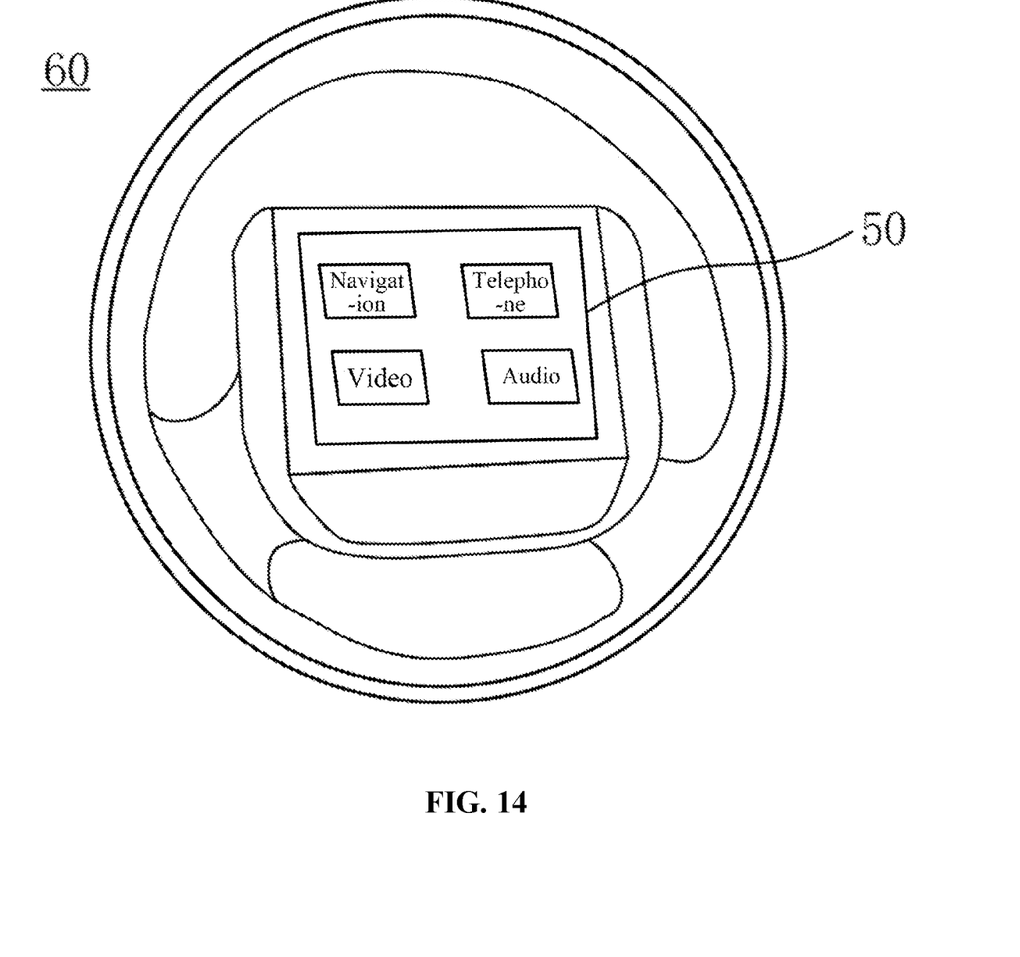
FIG. 14 is a structure diagram of a display device provided by an embodiment of the present disclosure.

Illustratively, FIG. 14 is a structure view of a display device according to embodiments of the present disclosure. Referring to FIG. 14, a display device 60 includes a display panel 50 according to the embodiment described above.

Exemplarily, the display device 60 may be an in-vehicle touch screen. FIG. 6 only exemplarily shows that the in-vehicle touch screen is integrated with a steering wheel, and is able to display touch buttons such as "navigation", "video", "audio" and "telephone". For the display screen, all areas other than the touch buttons may be display dark areas, and only when user's touch actions are performed on the touch buttons can trigger the actions. Therefore, by stopping providing the touch driving signal for the touch electrode in the display dark area, interactions between the user with the display interface cannot be influenced, and at the same time, the power consumption is reduced.

In other embodiments, the display device 60 may also be integrated with other structural components in the vehicle, such as be integrated with a front windshield, or a table around the steering wheel or the dashboard; or the display device 60 may be configured independently of the inherent structure of the vehicle.

In other embodiments, contents displayed on the display screen may be replaced according to the actual requirements.

In other embodiments, the display device 60 may also be a mobile phone, a computer, a smart wearable device.

What is claimed is:
1. A display driving method, comprising:
acquiring a to-be-displayed image, wherein the to-be-displayed image is displayed by display pixels, and a vertical projection of each of touch electrodes on a plane in which the display pixels are located covers a plurality of display pixels;

determining whether an area in which the touch electrodes are located is in a display dark area according to the to-be-displayed image; and in response to determining that the area in which the touch electrodes are located is in the display dark area, stopping providing a touch driving signal for at least part of the touch electrodes disposed in the display dark area;

wherein the to-be-displayed image is displayed in the display dark area and a display bright area.

2. The display driving method of claim 1, wherein the acquiring the to-be-displayed image comprises:

acquiring display information of the plurality of display pixels, wherein the display information comprises a data voltage, a display gray scale or a display brightness of the display pixels.

3. The display driving method of claim 2, wherein the determining whether the area in which touch electrodes are located is in the display dark area according to the to-be-displayed image comprises:

for the each of the touch electrodes, determining a number of display pixels in which a value of the display information of the plurality of display pixels covered by the touch electrodes is less than a first preset value;

calculating a ratio of the number to a total number of display pixels that are covered by the touch electrodes;

determining whether the ratio is greater than a preset ratio; and in response to determining that the ratio is greater than the preset ratio, determining that the area in which the touch electrodes are located is in the display dark area.

4. The display driving method of claim 3, wherein for the each of the touch electrodes, the determining the number of display pixels in which the value of the display information of the plurality of display pixels covered by the touch electrodes is less than the first preset value comprises:

determining the first preset value;

for the each of the touch electrodes, comparing the value of the display information of the plurality of display pixels covered by the touch electrodes with a magnitude of the first preset value one by one; and determining that the number of display pixels in which the value of the display information is less than the first preset value.

5. The display driving method of claim 2, wherein the determining whether the area in which touch electrodes are located is in the display dark area according to the to-be-displayed image comprises:

for the each of the touch electrodes, determining whether an average value of the display information of the plurality of display pixels covered by the touch electrodes is less than a second preset value;

in response to determining that the average value of the display information is less than the second preset value, determining that the area in which the touch electrodes are located is in the display dark area.

6. The display driving method of claim 1, wherein one frame of the to-be-displayed image comprises a plurality of display periods and touch periods alternately arranged, the stopping providing the touch driving signal for at least part of the touch electrodes disposed in the display dark area comprises:

stopping providing the touch driving signal of a current frame for at least part of the touch electrodes disposed in the display dark area.

7. The display driving method of claim 1, wherein one frame of the to-be-displayed image comprises a plurality of display periods and touch periods alternately arranged, the stopping providing the touch driving signal for at least part of the touch electrodes disposed in the display dark area comprises:

stopping providing the touch driving signal of a next frame for at least part of the touch electrodes disposed in the display dark area.

8. A display panel, comprising:

an image acquisition device, which is configured to acquire a to-be-displayed image, wherein the to-be-displayed image is displayed by display pixels, and a vertical projection of each of touch electrodes on a plane in which the display pixels are located covers a plurality of display pixels;

an image determination device, which is configured to determine whether an area in which the touch electrodes are located is in a display dark area according to the to-be-displayed image; and a signal providing device, which is configured to stop providing the touch driving signal for at least part of the touch electrodes disposed in the display dark area;

wherein the to-be-displayed image is displayed in the display dark area and a display bright area.

9. The display panel of claim 8, further comprising: an integrated driving circuit;

the image acquisition device, the image determination device and the signal providing device are integrated into the integrated driving circuit.

10. The display panel of claim 8, wherein the image determination device comprises a number determination sub-device, a ratio calculation sub-device and a status determination sub-device;

the number determination sub-device is configured to: for each of the touch electrodes, determine a number of display pixels in which a value of display information of the plurality of display pixels covered by the touch electrodes is less than a first preset value;

the ratio calculation sub-device is configured to calculate a ratio of the number to a total number of display pixels that are covered by the touch electrodes;

the status determination sub-device is configured to determine that the area in which the touch electrodes are located is in the display dark area in response to determining that a ratio is greater than a preset ratio;

wherein the display panel further comprises an integrated driving circuit;

an image acquisition circuit, the ratio calculation sub device, the status determination sub-device and the signal providing device are integrated into the integrated driving circuit.

11. The display panel of claim 10, wherein the number determination sub-device comprises a comparator and a counter;

wherein the display panel further comprises a plurality of data lines, a plurality of scanning lines, and the display pixels arranged in an array, pixel areas are formed by intersections of the plurality of data lines and the plurality of scanning lines, and each of the pixel areas is provided with one of the plurality of display pixels, control terminals of the plurality of display pixels are electrically connected to the plurality of scanning lines, and data terminals of the plurality of display pixel are electrically connected to the plurality of data lines; the plurality of data lines are electrically connected to data input terminals of the comparator, reference input terminals of the comparator are electrically connected to one reference signal terminal, and an output terminal of the comparator is electrically connected to an input terminal of the counter; and an output terminal of the counter is electrically connected to a ratio calculation sub-device.

12. The display panel of claim 11, wherein for the plurality of display pixels covered by a same touch electrode, a plurality of comparators and at least one counter are configured;

wherein each of the plurality of comparators comprises one data input terminal, one reference input terminal and one output terminal, wherein the counter comprises a plurality of input terminals, one control terminal and one output terminal, the plurality of display pixels are configured in one-to-one correspondence with the plurality of comparators;

wherein one of the plurality of data lines corresponding to each of the plurality of display pixels is electrically connected to the data input terminal of a respective one of the plurality of comparators through one auxiliary connection line, and reference input terminals of the plurality of comparators are electrically connected to a same reference signal terminal;

wherein the output terminal of the comparator to which display pixels disposed in a same row are electrically connected is electrically connected to the input end of a same counter of the at least one counter, a control terminal of the same counter is electrically connected to a counter control signal line; and wherein the counter control signal line is configured to provide a control signal to the at least one counter.

13. The display panel of claim 11, wherein the touch electrodes are arranged in an array, and each of the touch electrodes covers display pixels of M rows and N columns, and both M and N are positive integers greater than 0;

one comparator and one counter are configured corresponding to A touch electrodes in a same column, the comparator comprises N data input terminals, one reference input terminals, N control terminals, and one output terminal, the counter comprises one input terminal, one output terminal and M*A control terminals, and A is a positive integer greater than 0;

wherein each of the plurality of data lines is electrically connected to one of the data input terminals of the comparator through one auxiliary connection line, the reference input terminal of the comparator is electrically connected to one reference signal terminal, and the output terminal of the comparator is electrically connected to the input terminal of the counter; each of the N control terminals of the comparator is electrically connected to a respective one of N comparator control signal lines, and each of M*A control terminals of the counter is electrically connected to a respective one of M*A counter control signal lines;

wherein the comparator control signal lines are configured to provide a control signal to the comparator, and the counter control signal lines are configured to provide the control signal to the counter.

14. The display panel of claim 11, wherein for the plurality of display pixels covered by a same touch electrode, a plurality of comparators and at least one counter are configured;

wherein each of the plurality of comparators comprises one data input terminals, one reference input terminal and one output terminal;

wherein the counter comprises a plurality of input terminals, a plurality of control terminals and one output terminal, wherein the plurality of display pixels are configured in one-to-one correspondence with the plurality of comparators, the plurality of comparators are configured in one-to-one correspondence with the plurality of input terminals of the counter, and display pixels in each row correspond to one of the plurality of control terminals of the counter;

wherein one data line corresponding to one of the plurality of display pixels is electrically connected to the data input terminal of a respective one of the plurality of comparators through one auxiliary connection line, and reference input terminals of the plurality of comparators are electrically connected to a same reference signal terminal, the output terminals of the plurality of comparators are electrically connected to the plurality of input terminals of the counter, each of the plurality of control terminals of the counter is electrically connected to a respective one of a plurality of counter control signal lines; and where the plurality of counter control signal lines are configured to provide a control signal to the counter.

15. The display panel of claim 12, wherein at least one of the plurality of scanning lines is multiplexed as one of a plurality of counter control signal lines.

16. The display panel of claim 11, wherein the comparator and the counter are configured in a flexible circuit board, a driving integrated circuit or a peripheral circuit area of the display panel.

17. A display device, comprising: a display panel, wherein the display panel comprises:

an image acquisition device, which is configured to acquire a to-be-displayed image, wherein the to-be-displayed image is displayed by display pixels, and a vertical projection of each of touch electrodes on a plane in which the display pixels are located covers a plurality of display pixels;

an image determination device, which is configured to determine whether an area in which the touch electrodes are located is in a display dark area according to the to-be-displayed image; and a signal providing device, which is configured to stop providing the touch driving signal for at least part of the touch electrodes disposed in the display dark area;

wherein the to-be-displayed image is displayed in the display dark area and a display bright area.

* * * * *